(12) United States Patent
Richardson

(10) Patent No.: US 10,065,735 B2
(45) Date of Patent: Sep. 4, 2018

(54) ROTOR/WING AIRCRAFT INCLUDING VECTORABLE NOZZLE

(71) Applicant: The Boeing Company, Chicago, IL (US)

(72) Inventor: Steven D. Richardson, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/840,979

(22) Filed: Dec. 13, 2017

(65) Prior Publication Data

US 2018/0170536 A1 Jun. 21, 2018

Related U.S. Application Data

(60) Continuation of application No. 14/258,003, filed on Apr. 21, 2014, now Pat. No. 9,878,785, which is a division of application No. 12/099,724, filed on Apr. 8, 2008, now Pat. No. 8,757,537, which is a continuation-in-part of application No. 11/265,655, filed on Nov. 2, 2005, now Pat. No. 7,395,988.

(51) Int. Cl.
| | |
|---|---|
| *B64C 27/82* | (2006.01) |
| *B64C 15/14* | (2006.01) |
| *B64C 27/26* | (2006.01) |
| *B64C 27/24* | (2006.01) |
| *B64C 15/02* | (2006.01) |
| *B64C 27/18* | (2006.01) |
| *B64C 3/38* | (2006.01) |

(52) U.S. Cl.
CPC .............. *B64C 27/82* (2013.01); *B64C 3/385* (2013.01); *B64C 15/02* (2013.01); *B64C 15/14* (2013.01); *B64C 27/18* (2013.01); *B64C 27/24* (2013.01); *B64C 27/26* (2013.01); *Y02T 50/145* (2013.01)

(58) Field of Classification Search
CPC ......... B64C 27/82; B64C 3/385; B64C 15/02; B64C 15/14; B64C 27/24; B64C 27/26; B64C 27/18; Y02T 50/145
See application file for complete search history.

(56) References Cited

U.S. PATENT DOCUMENTS

| | | | |
|---|---|---|---|
| 1,933,307 | A | 10/1933 | Bolas |
| 2,526,941 | A | 10/1950 | Fishbein |
| 2,621,001 | A | 12/1952 | Roman |
| 2,679,364 | A | 5/1954 | Sforza Del Pesaro |
| 2,708,081 | A | 5/1955 | Dobson |
| 2,912,188 | A | 11/1959 | Singelmann |

(Continued)

OTHER PUBLICATIONS

Wikipedia, "Turboprop," retrieved from [https://en.wikipedia.org/wiki/Turboprop] on Dec. 8, 2017, 10 pages.

(Continued)

*Primary Examiner* — Valentina Xavier
(74) *Attorney, Agent, or Firm* — Hanley, Flight & Zimmerman, LLC

(57) ABSTRACT

A method of operating an aircraft having a rotor/wing assembly and a nozzle comprises vectoring the nozzle into a position for creating vertical thrust, and using the rotor/wing assembly and the nozzle together to create vertical thrust during a rotary mode of operation.

17 Claims, 8 Drawing Sheets

(56) References Cited

U.S. PATENT DOCUMENTS

| | | | |
|---|---|---|---|
| 2,917,895 A * | 12/1959 | Boushey | B64C 27/18 416/20 R |
| 2,940,691 A | 6/1960 | David | |
| 2,941,749 A | 6/1960 | Sullivan et al. | |
| 2,953,319 A | 9/1960 | Gluhareff | |
| 3,038,683 A | 6/1962 | Rowe | |
| 3,039,719 A | 6/1962 | Platt | |
| 3,049,320 A | 8/1962 | Fletcher | |
| 3,059,876 A | 10/1962 | Platt | |
| 3,096,041 A | 7/1963 | Cheeseman et al. | |
| 3,112,901 A | 12/1963 | Kohman | |
| 3,119,577 A | 1/1964 | Andrews | |
| 3,156,434 A | 11/1964 | Harrington | |
| 3,159,360 A | 12/1964 | Ryan et al. | |
| 3,163,376 A | 12/1964 | Davidson | |
| 3,227,399 A | 1/1966 | Dastoli et al. | |
| 3,235,205 A | 2/1966 | Newcomb | |
| 3,259,343 A | 7/1966 | Roppel | |
| 3,273,339 A | 9/1966 | Borysthen-Tkacz | |
| 3,278,138 A | 10/1966 | Haberkorn | |
| 3,282,534 A | 11/1966 | Serriades | |
| 3,298,633 A | 1/1967 | Dastoli et al. | |
| 3,318,097 A | 5/1967 | Wood et al. | |
| 3,326,498 A | 6/1967 | Corning | |
| 3,327,969 A | 6/1967 | Head | |
| 3,329,376 A | 7/1967 | Sullivan | |
| 3,368,778 A | 2/1968 | Wilde et al. | |
| 3,375,997 A | 4/1968 | Gist, Jr. | |
| 3,381,474 A | 5/1968 | Gist, Jr. | |
| 3,445,079 A | 5/1969 | Burns | |
| 3,454,241 A | 7/1969 | Riemerschmid | |
| 3,464,650 A | 9/1969 | Girard | |
| 3,490,720 A * | 1/1970 | Girard | B64C 3/40 244/46 |
| 3,506,219 A | 4/1970 | Mouille et al. | |
| 3,514,051 A | 5/1970 | Celayan | |
| 3,514,052 A | 5/1970 | McKeown | |
| 3,515,500 A | 6/1970 | Nachod | |
| 3,517,898 A * | 6/1970 | Laville | B64C 27/02 244/17.11 |
| 3,567,157 A | 3/1971 | Dancik | |
| 3,582,021 A | 6/1971 | Pender | |
| 3,635,426 A | 1/1972 | Stanley | |
| 3,666,209 A | 5/1972 | Taylor | |
| 3,739,580 A | 6/1973 | Bland et al. | |
| 3,762,667 A | 10/1973 | Pender | |
| 3,792,827 A * | 2/1974 | Girard | B64C 27/026 244/7 A |
| 3,794,273 A | 2/1974 | Girard | |
| 3,829,043 A | 8/1974 | Benson | |
| 3,907,219 A | 9/1975 | Pharris | |
| 3,972,490 A | 8/1976 | Zimmermann et al. | |
| 3,986,686 A * | 10/1976 | Girard | B64C 27/24 244/7 A |
| 4,044,971 A | 8/1977 | Pharris | |
| 4,059,247 A | 11/1977 | Prewitt | |
| 4,280,660 A | 7/1981 | Wooten, Jr. et al. | |
| 4,469,294 A | 9/1984 | Clifton | |
| 4,530,640 A | 7/1985 | MacInnes | |
| 4,711,415 A | 12/1987 | Binden | |
| 4,713,935 A | 12/1987 | Szuminski et al. | |
| 4,789,115 A | 12/1988 | Koutsoupidis | |
| 5,031,859 A | 7/1991 | Cunningham | |
| 5,086,993 A | 2/1992 | Wainfan | |
| 5,096,140 A | 3/1992 | Dornier, Jr. et al. | |
| 5,131,605 A | 7/1992 | Kress | |
| 5,174,523 A | 12/1992 | Balmford | |
| 5,405,105 A | 4/1995 | Kress | |
| 5,454,530 A | 10/1995 | Rutherford et al. | |
| 5,730,582 A * | 3/1998 | Heitmann | B63H 11/08 416/185 |
| 5,738,301 A | 4/1998 | Francois et al. | |
| 5,758,844 A | 6/1998 | Cummings | |
| 5,799,901 A | 9/1998 | Osder | |
| 5,839,691 A | 11/1998 | Lariviere | |
| 5,984,228 A | 11/1999 | Pham | |
| 6,050,520 A | 4/2000 | Kirla | |
| 6,131,849 A * | 10/2000 | Nyhus | B64C 27/18 244/17.11 |
| 6,340,133 B1 | 1/2002 | Capanna | |
| 6,471,158 B1 | 10/2002 | Davis | |
| 6,622,962 B1 | 9/2003 | White | |
| 6,659,394 B1 | 12/2003 | Shenk | |
| 6,789,764 B2 | 9/2004 | Bass et al. | |
| 6,896,221 B1 | 5/2005 | Einarsson | |
| 6,918,244 B2 | 7/2005 | Dickau | |
| 6,974,105 B2 | 12/2005 | Pham | |
| 7,014,142 B2 | 3/2006 | Barocela et al. | |
| 7,275,711 B1 * | 10/2007 | Flanigan | B64C 27/18 244/17.11 |
| 7,410,123 B2 | 8/2008 | Nunnally | |
| 7,946,526 B2 | 5/2011 | Zimet | |
| 2003/0222171 A1 | 12/2003 | Zoppitelli et al. | |
| 2004/0026563 A1 | 2/2004 | Moller | |
| 2004/0056144 A1 | 3/2004 | Bass et al. | |
| 2004/0075017 A1 | 4/2004 | Sash | |
| 2004/0222329 A1 | 11/2004 | Kuhns et al. | |
| 2005/0127238 A1 | 6/2005 | Ballew | |
| 2005/0133662 A1 | 6/2005 | Magre | |
| 2005/0230519 A1 | 10/2005 | Hurley | |
| 2005/0230520 A1 | 10/2005 | Kusic | |
| 2006/0022084 A1 | 2/2006 | Magre | |
| 2006/0157614 A1 | 7/2006 | Simpson | |
| 2007/0252032 A1 * | 11/2007 | Lawson | B64C 15/02 244/12.3 |
| 2008/0135677 A1 | 6/2008 | Oleshchuk et al. | |
| 2010/0001120 A1 | 1/2010 | Sun | |
| 2013/0062455 A1 | 3/2013 | Lugg et al. | |

OTHER PUBLICATIONS

United States Patent and Trademark Office, "Non-Final Office Action," issued in connection with U.S. Appl. No. 11/265,655, dated Aug. 8, 2006, 16 pages.

United States Patent and Trademark Office, "Requirement for Restriction and/or Election," issued in connection with U.S. Appl. No. 11/265,655, dated Feb. 20, 2007, 7 pages.

United States Patent and Trademark Office, "Final Office Action," issued in connection with U.S. Appl. No. 11/265,655, dated May 30, 2007, 11 pages.

United States Patent and Trademark Office, "Notice of Allowance and Fee(s) Due," issued in connection with U.S. Appl. No. 11/265,655, dated Nov. 19, 2007, 10 pages.

United States Patent and Trademark Office, "Notice of Allowance and Fee(s) Due," issued in connection with U.S. Appl. No. 11/265,655, dated Apr. 7, 2008, 8 pages.

United States Patent and Trademark Office, "Requirement for Restriction and/or Election," issued in connection with U.S. Appl. No. 12/099,724, dated Mar. 29, 2011, 7 pages.

United States Patent and Trademark Office, "Non-Final Office Action," issued in connection with U.S. Appl. No. 12/099,724, dated Jun. 27, 2011, 13 pages.

United States Patent and Trademark Office, "Non-Final Office Action," issued in connection with U.S. Appl. No. 12/099,724, dated Apr. 12, 2012, 11 pages.

United States Patent and Trademark Office, "Non-Final Office Action," issued in connection with U.S. Appl. No. 12/099,724, dated Nov. 23, 2012, 12 pages.

United States Patent and Trademark Office, "Non-Final Office Action," issued in connection with U.S. Appl. No. 12/099,724, dated Jul. 25, 2013, 11 pages.

United States Patent and Trademark Office, "Notice of Allowance and Fee(s) Due," issued in connection with U.S. Appl. No. 12/099,724, dated Dec. 11, 2013, 10 pages.

United States Patent and Trademark Office, "Restriction and/or Election Requirement," issued in connection with U.S. Appl. No. 14/258,003, dated Oct. 7, 2016, 8 pages.

(56) References Cited

OTHER PUBLICATIONS

United States Patent and Trademark Office, "Non-Final Office Action," issued in connection with U.S. Appl. No. 14/258,003, dated Dec. 1, 2016, 8 pages.

United States Patent and Trademark Office, "Final Office Action," issued in connection with U.S. Appl. No. 14/258,003, dated Jun. 20, 2017, 8 pages.

United States Patent and Trademark Office, "Notice of Allowance and Fee(s) Due," issued in connection with U.S. Appl. No. 14/258,003, dated Oct. 23, 2017, 10 pages.

United States Patent and Trademark Office, "Final Office Action," issued in connection with U.S. Appl. No. 12/099,724, dated Mar. 2, 2012, 8 pages.

* cited by examiner

ROTOR/WING AIRCRAFT INCLUDING VECTORABLE NOZZLE

RELATED APPLICATIONS

This patent arises from a continuation of U.S. application Ser. No. 14/258,003, titled "Rotor/Wing Aircraft Including Vectorable Nozzle," filed Apr. 21, 2014, which is a divisional of U.S. application Ser. No. 12/099,724 (now U.S. Pat. No. 8,757,537), "Systems and Methods for Rotor/Wing Aircraft," filed Apr. 8, 2008, which is a continuation-in-part of U.S. application Ser. No. 11/265,655 (now U.S. Pat. No. 7,395,988), titled "Rotor Wing Aircraft Having an Adjustable Tail Nozzle," filed Nov. 2, 2005. U.S. application Ser. No. 14/258,003, U.S. application Ser. No. 12/099,724, and U.S. application Ser. No. 11/265,655 are hereby incorporated by this reference in their entireties.

BACKGROUND

A rotor/wing aircraft offers the ability to hover like a helicopter plus the promise of achieving the high speeds of a fixed-wing aircraft by stopping the rotor's rotation while in flight and allowing it to act as a fixed wing. See, for example, U.S. Pat. No. 3,327,969

A Canard Rotor/Wing (CRW) concept (see, e.g., U.S. Pat. No. 5,454,530) combines a reaction-driven, stoppable-rotor with a high-lift canard and tail. Exhaust gas from a common power plant provides direct thrust for fixed-wing flight and is routed to the blade tips to power the reaction-driven rotor for rotary-wing flight. Together the canard and tail provide all of the aircraft's lift during transition between rotary-wing and fixed-wing flight, thereby allowing the rotor to be unloaded during starting and stopping.

Reaction driven rotors have their own unique inefficiencies. Coriolis losses associated with accelerating the propulsive gases radially as the rotor blade spins consumes up to 40% of power available. Thus, stopped-rotor aircraft designs are sought that are more efficient than the reaction-driven, rotor/wing system of the CRW.

SUMMARY

A method of operating an aircraft having a rotor/wing assembly and a nozzle comprises vectoring the nozzle into a position for creating vertical thrust, and using the rotor/wing assembly and the nozzle together to create vertical thrust during a rotary mode of operation.

An aircraft comprises a propulsion system operable to produce an exhaust flow, a vectorable nozzle for receiving the exhaust flow, and a vertical lift assembly configured to be driven by the propulsion system during a rotary mode of operation.

A propulsion system comprises a turbine engine, a vectorable nozzle configured to receive exhaust flow from the turbine engine during a fixed mode of operation, and a vertical lift assembly. The vertical lift assembly includes a rotor/wing, and a drive shaft and gear box configured to extract work from the turbine engine and rotate the rotor/wing to create lift during a rotary mode of operation.

The features, functions, and advantages that will be discussed can be achieved independently in various embodiments of the present disclosure or may be combined in yet other embodiments further details of which can be seen with reference to the following description and drawings.

DETAILED DESCRIPTION

Figure 1:
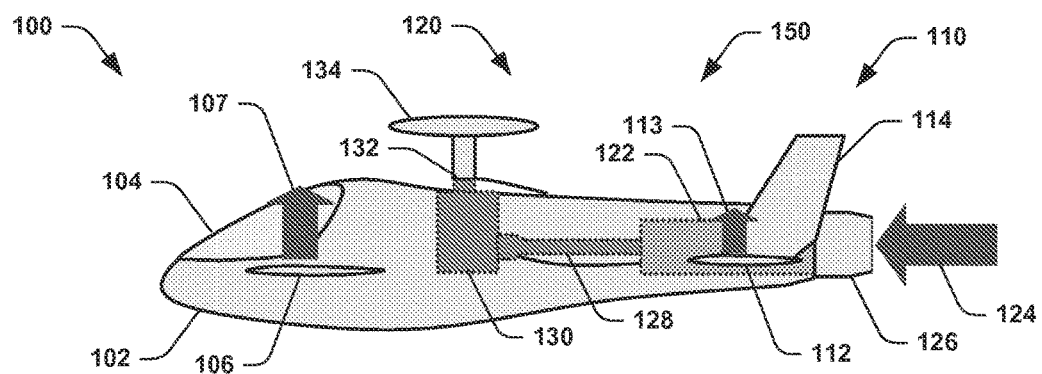
FIG. 1 is a side sectional view of an aircraft in a fixed-wing mode of operation.

FIG. 1 shows an aircraft 100 in a fixed-wing mode 150 of operation. In this embodiment, the aircraft 100 includes a fuselage 102 of an airframe defining a cockpit portion 104. A canard 106 extends outwardly from each lateral side of the fuselage 102 (one visible). The aircraft 100 further includes a tail assembly 110 having a horizontal tail surface 112 that extends outwardly from each lateral side of the fuselage 102 (one visible), and a vertical tail surface 114 that extends upwardly from each horizontal tail surface 112 (one visible).

As further shown in FIG. 1, the aircraft 100 includes a propulsion system 120 having at least one engine 122 disposed within an aft portion of the fuselage 102 proximate the tail assembly 110. An engine exhaust flow from the engine 122 is directed through a nozzle assembly 126 to provide a primary thrust 124 for propelling the aircraft 100 in the fixed-wing mode 150 of operation. In the fixed-wing mode 150 of operation, a canard lift 107 is generated by each canard 106, and a tail lift 113 is generated by each horizontal tail surface 112.

A primary shaft 128 extends generally forwardly within the fuselage 102 from the engine 122 to a gearbox assembly 130. The primary shaft 128 may be driven by the engine 122 using a conventional power-takeoff configuration generally known in the art. A secondary shaft 132 extends generally upwardly from the gearbox assembly 130 to a rotor/wing assembly 134. In the fixed-wing mode 150 of operation shown in FIG. 1, the rotor/wing assembly 134 is held in a fixed position suitable for forward flight.

Figure 2:
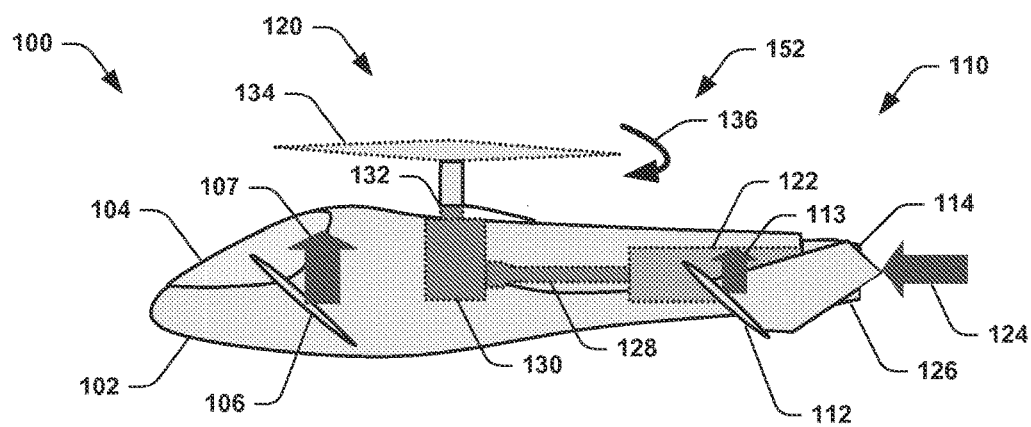
FIGS. 2 and 3 are side sectional views of the aircraft of FIG. 1 in conversion and rotary-wing flight modes of operation, respectively.

FIG. 2 shows the aircraft 100 of FIG. 1 in a conversion mode 152 of operation. In this embodiment, the primary wings (or canard) 106 and the tail assembly 110 are in the process of transitioning from the fixed-wing mode 150 of operation to a rotary-wing mode 154 (described below with respect to FIG. 3). More specifically, in some embodiments, each canard 106 and tail assembly 110 is pivotable between a first position (FIG. 1) configured to provide a lift force in the fixed-wing mode 150 of operation, and a second position (FIG. 3) configured to minimize a downward force in the rotary-wing mode 154 of operation.

In addition, rotation of the secondary shaft 132 has initiated rotation of the rotor/wing assembly 134 in a rotational direction 136. Comparison of FIG. 2 with FIG. 1 shows that the primary thrust 124 from the engine 122 is reduced in comparison with the fixed-wing mode 150 of operation. In the conversion mode 152 of operation, the lift from the canards 106 and the tail assembly 110 may continue to provide 100% of the lift required to maintain flight to allow the rotor/wing assembly 134 to start and stop while unloaded. The vertical tail surfaces 114 of the tail assembly 110 provide antitorque forces during the conversion mode 152 of operation.

Figure 3:
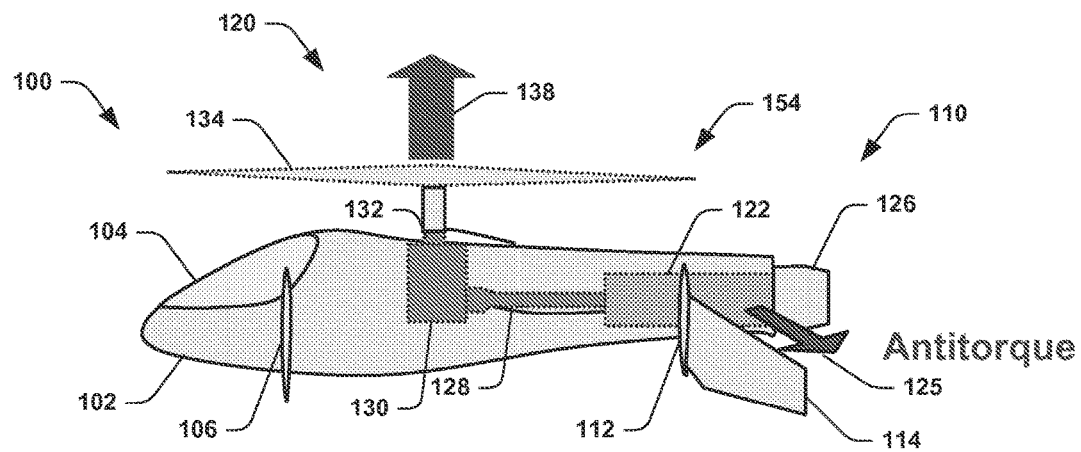

The aircraft 100 is shown operating in the rotary-wing mode 154 of operation in FIG. 3. In this embodiment, the canards 106 and the tail assembly 110 are fully pivoted from their respective positions in the fixed-wing mode 150 of operation (e.g. approximately 90 degrees) shown in FIG. 1. In addition, the rotational velocity of the primary shaft 128 has increased such that a primary lift component 138 from the rotor/wing assembly 134 is sufficient to support the aircraft 100 in vertical flight (ascent or descent) or hover as desired. Further, the primary thrust 124 from the engine 122 may be approximately zero, and a portion of the engine exhaust flow may be used as a yaw control (or anti-torque) flow 125 to counteract a torque generated by the rotation of the rotor/wing assembly 134. For example, the yaw control flow 125 may be exhausted through a yaw control nozzle to provide a control force having a laterally-directed component that counteracts the torque generated by the rotation of the rotor/wing assembly 134. More specifically, in some embodiments, the yaw control flow 125 may be directed through a yaw control system such as the NOTAR® system, or any other suitable yaw control system.

Figure 4:
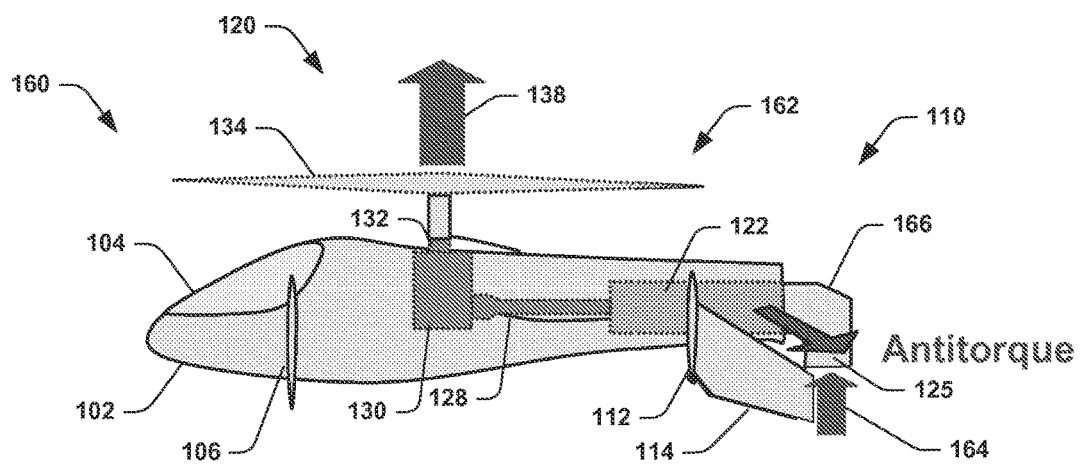
FIG. 4 is a side sectional view of an aircraft in a rotary-wing mode of operation.

FIG. 4 is a side view of an aircraft 160 in a rotary-wing mode 162 of operation and is shown as an enhancement to the first embodiment. Many of the components of the aircraft 160 shown in FIG. 4 are similar or identical to the components of the aircraft 100 described above with respect to FIGS. 1 through 3, and therefore, for the sake of brevity, a description of such components will not be repeated. In this embodiment, however, the aircraft 160 includes a vectorable nozzle 166 that is configured to controllably vector an engine thrust component 164 from approximately horizontal in the fixed-wing mode 150 to approximately vertical in the rotary-wing mode 154 (FIG. 4). Thus, in addition to the primary lift components 138 generated by the rotor/wing assembly 134, the aircraft 160 may also rely upon the engine thrust component 164 during the rotary-wing mode 162 of operation. When the aircraft 160 returns to the fixed-wing mode 150 of operation (FIG. 1), the vectorable nozzle 166 may be returned to a generally aftward-facing direction to provide the generally horizontal thrust 124 needed for forward flight as shown in FIG. 1.

Figure 5:
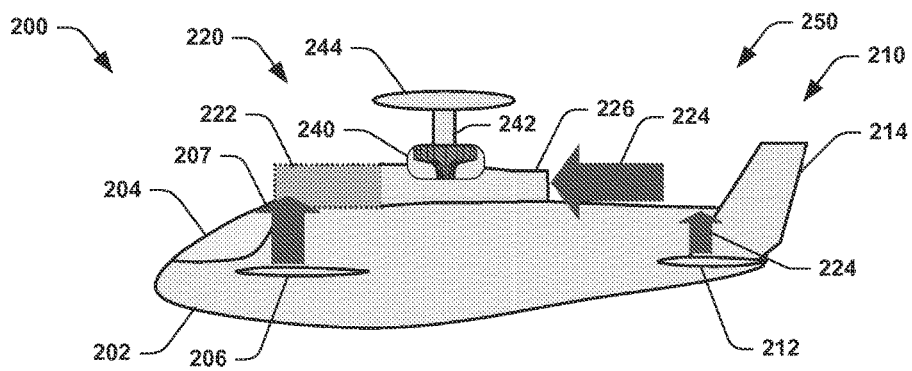
FIG. 5 is a side sectional view of an aircraft in a fixed-wing mode of operation.
Figure 6:
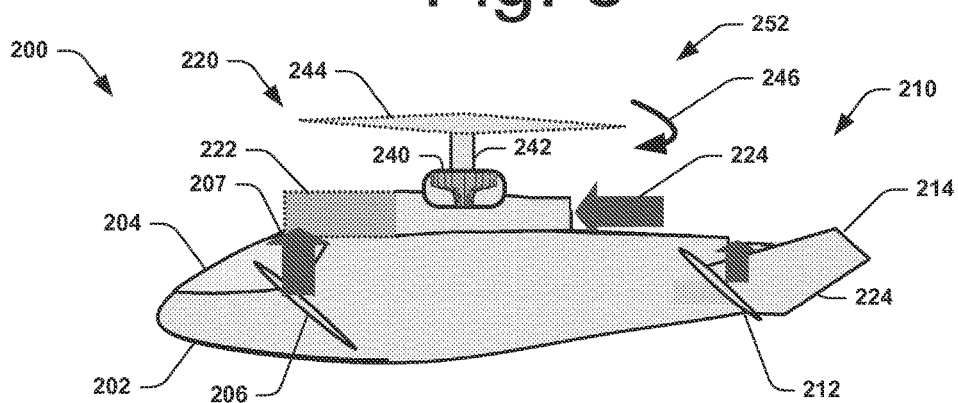
FIGS. 6 and 7 are side sectional views of the aircraft of FIG. 5 in conversion and rotary-wing flight modes of operation, respectively.
Figure 7:
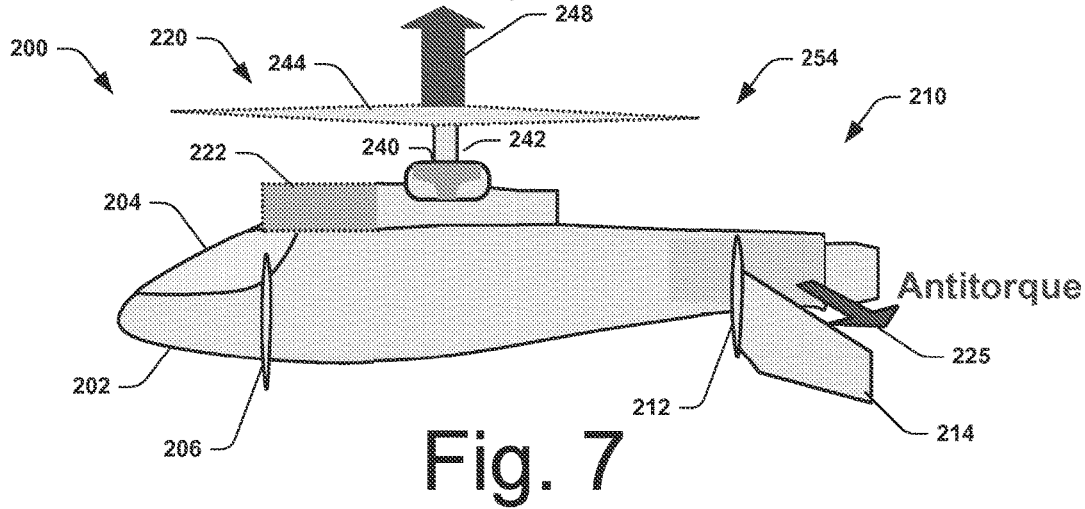

FIGS. 5 through 7 are side sectional views of an aircraft 200 in accordance with another embodiment. More specifically, in FIG. 5, the aircraft 200 is shown in a fixed-wing mode 250 of operation. The aircraft 200 includes a fuselage (or airframe) 202 defining a cockpit portion 204, and having canards 206 that extend outwardly from each lateral side of the fuselage 202 (one visible). The aircraft 200 further includes a tail assembly 210 having a horizontal tail surface 212 that extends outwardly from each lateral side of the fuselage 202 (one visible), and a vertical tail surface 214 that extends upwardly from each horizontal tail surface 212 (one visible).

As further shown in FIG. 5, the aircraft 200 includes a propulsion system 220 having at least one engine 222 coupled to (or disposed within) a dorsal (or upper) portion of the fuselage 202. An engine exhaust flow from the engine 222 is directed through a nozzle assembly 226 to provide a primary thrust 224 for propelling the aircraft 200 in the fixed-wing mode 250 of operation. In the fixed-wing mode 250, a canard lift 207 is generated by each canard 206, and a tail lift 213 is generated by each horizontal tail surface 212.

Figure 10:
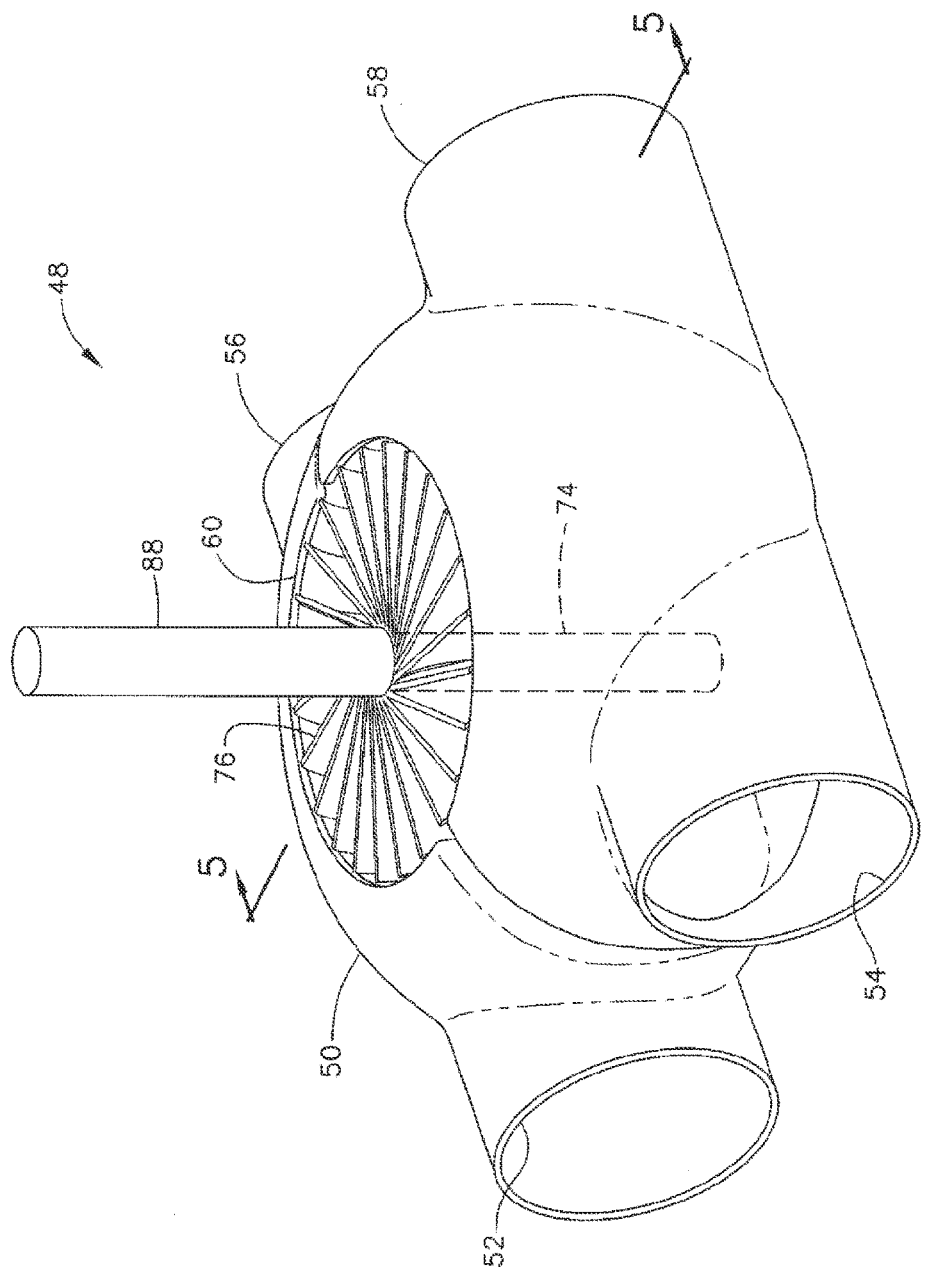
FIG. 10 is a perspective of a radial inflow turbine.
Figure 11:
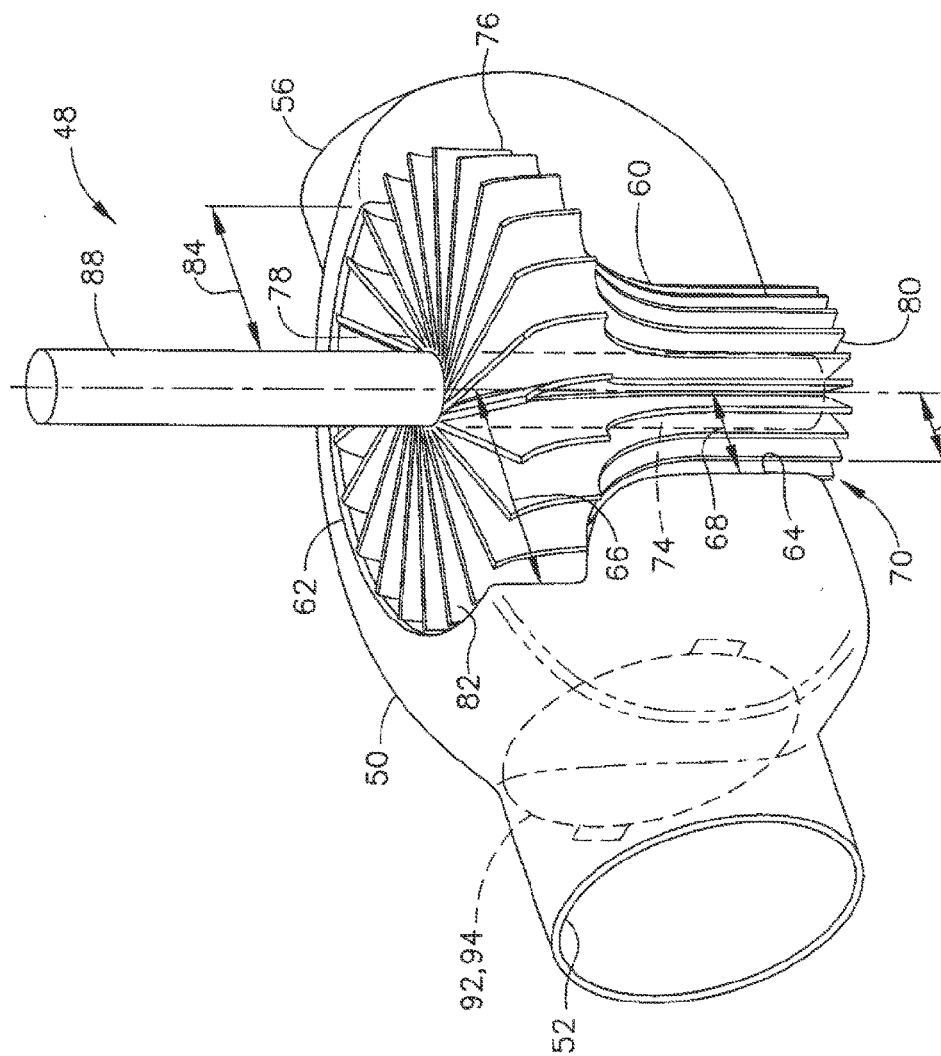
FIG. 11 is a perspective of the radial inflow turbine of FIG. 10 shown without half of a body of the radial inflow turbine.
Figure 12:
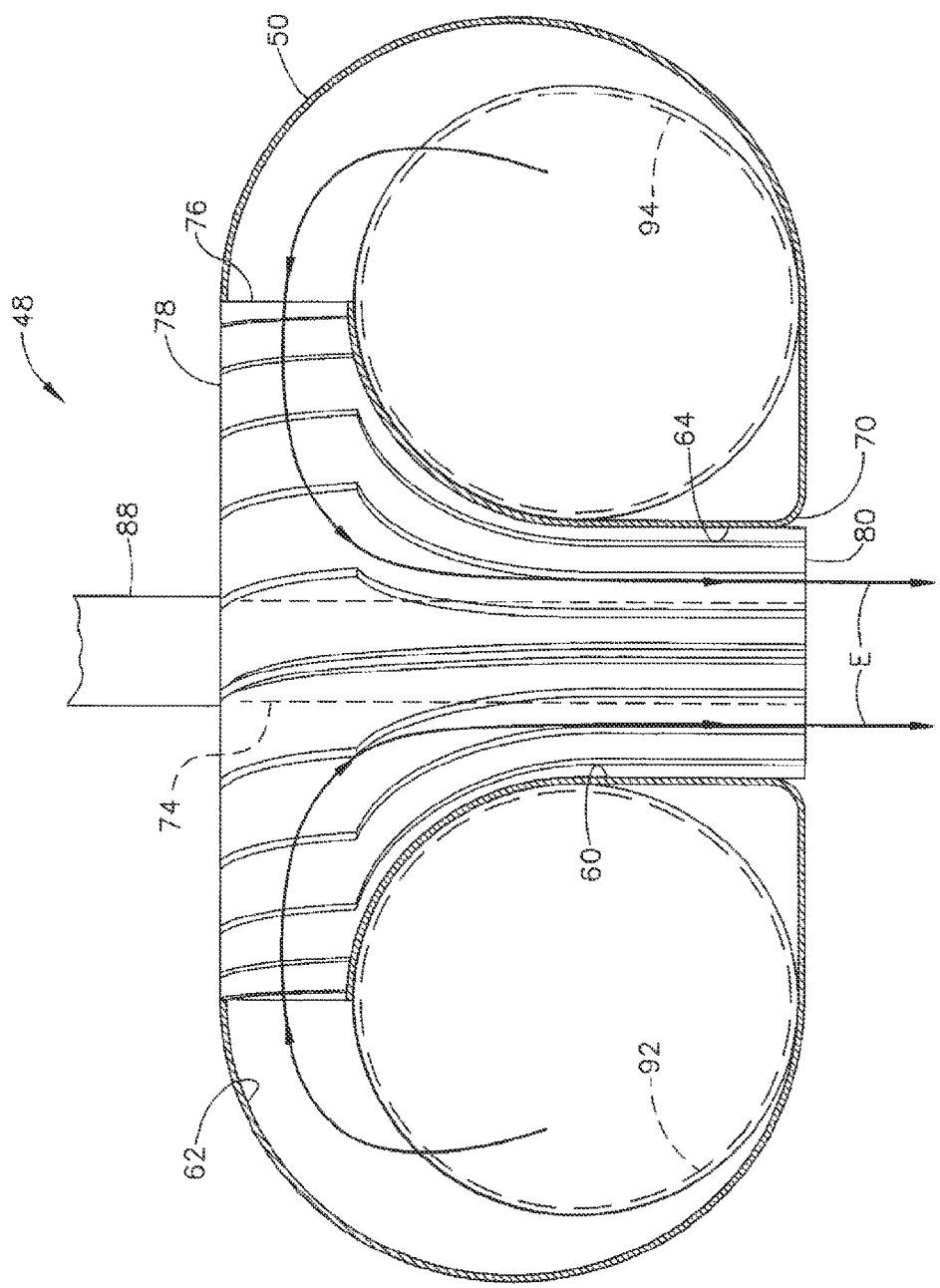
FIG. 12 is a cross section taken along lines 5-5 of FIG. 10.

A radial inflow turbine 240 is positioned aft of the engine 222. In some embodiments, the radial inflow turbine 240 is of a type as generally described more fully below with respect to FIGS. 10 through 12. More specifically, in particular embodiments, the aircraft 200 includes two engines 222 in a laterally-spaced (or side-by-side) arrangement (one visible), and the radial inflow turbine 240 is configured as shown in FIGS. 10 through 12. A drive shaft 242 extends generally upwardly from the radial inflow turbine assembly 240 to a rotor/wing assembly 244. In the fixed-wing mode 250 of operation shown in FIG. 5, the rotor/wing assembly 244 is held in a fixed position suitable for forward flight.

FIG. 6 shows the aircraft 200 of FIG. 5 in a conversion mode 252 of operation. In this embodiment, the canards 206 and the tail assembly 210 have started pivoting as described above with respect to the embodiment shown in FIG. 2. Rotation of the drive shaft 242 has initiated rotation of the rotor/wing assembly 244 in a rotational direction 246. In the conversion mode 252 of operation, the lift from the canards 206 and the tail assembly 210 may continue to provide 100% of the lift required to maintain flight during transition to allow the rotor/wing assembly 244 to start and stop while unloaded. The vertical tail surfaces 214 of the tail assembly 210 provide antitorque forces during the conversion mode 252 of operation.

FIG. 7 shows the aircraft 200 in the rotary-wing mode 254 of operation, in which the canards 206 and the tail assembly 210 have fully pivoted as described above with respect to the embodiment shown in FIG. 3. In this embodiment, the rotational velocity of the drive shaft 242 has increased such that the rotor/wing assembly 244 is rotating at sufficient velocity to generate a primary lift component 238 from the rotor/wing assembly 244 sufficient to support the aircraft 200 in vertical flight (ascent or descent) or hover. A portion of the engine exhaust flow may be used as a yaw control (or anti-torque) flow 225 to counteract a torque generated by the rotation of the rotor/wing assembly 244 using a suitable yaw control system.

Figure 8:
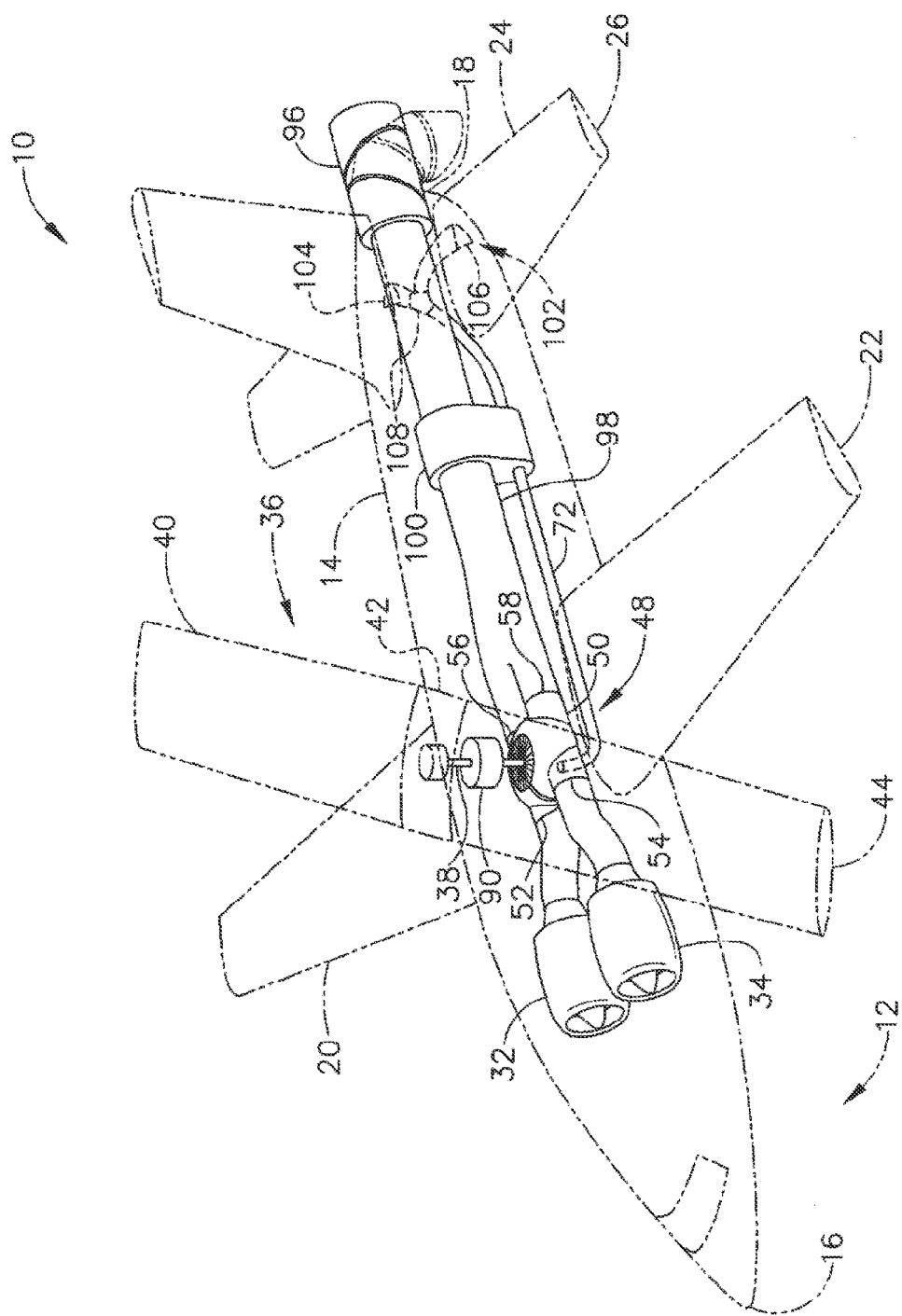
FIG. 8 is a perspective of an aircraft.

Referring to FIG. 8, an aircraft 10 according to another embodiment has an airframe 12, which includes a fuselage 14 having a nose or forward end 16 and a tail or aft end 18. The aircraft 10 further includes at least two primary fixed wings or canards 20 extending laterally from the fuselage. Each primary fixed wing 20 has a wing tip 22 opposite the fuselage 14. The aircraft 10 may also include a rear set of fixed wings 24. Each rear fixed wing 24 has a wing tip 26 opposite the fuselage 14.

The specific dimensions of the components of the aircraft 10 may vary considerably from embodiment to embodiment. For example, although the fuselage 14 may have other lengths extending between the forward end 16 and the aft end 18 without departing from the scope of the present disclosure, in some embodiments the fuselage 14 has a length of between about 60 feet and about 70 feet. Similarly, in some embodiments the aircraft 10 may have a canard span of between about 35 feet and about 45 feet, and in further embodiments, the rear wingspan may be between about 30 feet and about 40 feet.

The fixed wings 20, 24 may fold or pivot. For example, in one embodiment each of the fixed wings 20, 24 has a chord 28, 30 and the fixed wings are pivotally mounted on the fuselage 14 for selective movement between a fixed-wing flight position, in which the respective chord extends generally horizontally, and a rotary-wing flight position, in which the respective chord extends generally vertically. The forward flight position of the fixed wings 20, 24 is shown by solid lines in FIG. 9 and generally indicated by reference arrow F and the vertical flight position is shown by dashed lines and generally indicated by reference arrow V. The fixed wings 20, 24 may also be moved to intermediate flight positions (not shown) between the forward and vertical flight positions wherein the respective wing chord 28, 30 is between horizontal and vertical.

As shown in FIG. 8, in this embodiment, the aircraft 10 further includes one or more power plants 32, 34 mounted on the airframe. The power plants 32, 34 produce power in the form of hot high-pressure gas or exhaust during their operation. Although the power plants 32, 34 may produce other amounts of power without departing from the scope of the present disclosure, in some embodiments the power plants produce between about 11,000 pounds and about 13,000 pounds of thrust. Although other power plants 32, 34 may be used without departing from the scope of the present disclosure, in one embodiment each power plant is a F404 Turbofan available from General Electric Company of Cincinnati, Ohio.

The aircraft 10 also includes at least one rotor/wing, generally designated by 36, rotatably mounted on the aircraft by way of a drive shaft 38. The rotor/wing 36 includes a plurality of blades 40 extending radially from a central hub 42 that is connected to the drive shaft 38 to a blade tip 44. In one embodiment, the rotor/wing 36 has two primary blades 40 extending from the hub 42 in opposite directions from each other. Although the blades 40 may have other lengths between the hub 42 and the respective blade tips 44, in one embodiment each blade has a length of between about 30 feet and about 35 feet. Because the blades 40 and the drive shaft 38 do not need to be configured for routing exhaust, the blades and drive shaft can be thinner and lighter than the blades and rotor mast of reaction-drive rotor/wing aircraft. The reduced weight and drag characteristics of the rotor/wing 36 improves aircraft 10 performance and lowers power requirements compared to reaction-drive systems. Although the blades 40 may have other maximum thicknesses 46 without departing from the scope of the present disclosure, in one embodiment each blade has a maximum thickness of between about 1 foot and about 2 feet. Although the rotor blades 40 may be made of other materials, in one embodiment at least a portion of the blades are made of a polymer composite.

The aircraft 10 has a rotation mode wherein the rotor/wing 36 is rotated by the power plants 32, 34 and a fixed mode wherein the rotor/wing is locked to prevent rotor/wing rotation. In the rotation mode, the rotor/wing 36 rotates to provide upward thrust to the aircraft 10. The primary fixed wings 20 are moved to their vertical flight position V when the aircraft 10 is in the rotation mode so the primary fixed wings minimally interfere with rotor 36 downwash and thus minimally inhibit the production of upward thrust by the rotor. The rear fixed wings 24 are also rotated to their vertical flight position when the aircraft 10 is in the rotation mode so they minimally inhibit upward propulsion. In the fixed mode, the rotor/wing 36 is locked so the blades 40 extend laterally to provide aerodynamic lift to the aircraft 10 during forward flight. The aircraft 10 may also fly at intermediate flight modes wherein the aircraft is propelled at an angle between vertical and horizontal. For example, an aircraft 10 transitioning between vertical and horizontal flight will fly at angles between vertical and horizontal. The fixed wings 20, 24 are moved to their forward flight positions F when the aircraft 10 is in the fixed mode and can assume intermediate flight positions corresponding to intermediate flight modes.

The aircraft 10 also includes a radial inflow turbine, generally designated by 48, mounted on the airframe 12 in fluid communication with the power plants 32, 34 for receiving exhaust from the power plants. The radial inflow turbine 48 is mechanically connected to the rotor/wing 36 and converts exhaust from the power plants 32, 34 to mechanical power for rotating the rotor/wing during operation of the aircraft 10. Losses incurred in converting the exhaust to mechanical power for rotating the rotor/wing 36 are generally lower than the losses incurred between the power plant(s) and the rotor/wing in a conventional reaction-drive rotor/wing system. The higher efficiency of the radial inflow radial inflow turbine 48 system according to the present disclosure enables high performance and uses less power than is required for reaction-drive systems. As shown in FIG. 10, the radial inflow radial inflow turbine 48 includes a body or housing 50 forming a first inlet 52 and a second inlet 54. As shown in FIG. 8, the first and second inlets 52, 54 are in fluid communication with the first and second power plants 32, 34, respectively. The turbine body 50 also forms a first aft outlet 56 and a second aft outlet 58 downstream from the first and second inlets 52, 54, respectively.

In addition, the turbine body 50 forms an annular vortical plenum or chamber 60 in fluid communication with the inlets 52, 54 and outlets 56, 58. As shown in FIG. 11, the vortical chamber 60 has an upper portion 62 and a lower portion 64. Although the upper portion 62 of the vortical chamber 60 may have other minimum radii 66 without departing from the scope of the present disclosure, in one embodiment the upper portion has a minimum radius of between about 20 inches and about 22 inches. Although the lower portion 64 of the vortical chamber 60 may have other maximum radii 68 without departing from the scope of the present disclosure, in one embodiment the lower portion has a maximum radius of between about 7 inches and about 9 inches. The radial inflow radial inflow turbine 48 further includes a chamber outlet 70 downstream from the vortical chamber 60. Exhaust from the power plants 32, 34 passing through the vortical chamber 60 exits the radial inflow turbine 48 with reduced energy by way of the chamber outlet 70. Upon exiting the chamber outlet 70, the exhaust flows into a low-energy conduit 72, as shown in FIG. 8.

The radial inflow turbine 48 also includes a hub 74 rotatably connected to the turbine body 50 and a plurality of vanes 76 extending radially outward from the hub. The hub 74 and the vanes 76 are positioned in the turbine vortical chamber 60. Each of the vanes 76 includes a top 78 positioned in the upper portion 62 of the vortical chamber 60 and a bottom 80 positioned in the lower portion 64 of the vortical chamber. Each vane 76 is pitched from its top 78 to its bottom 80. As will be appreciated by those skilled in the art, the pitch of the vanes 76 creates an oblique surface 82 against which power plant 32, 34 exhaust is directed to cause the vanes 76 and hub 74 to rotate during operation of the aircraft 10 in the rotation mode. In one embodiment, each vane 76 has a maximum radius 84 corresponding to the minimum radius 66 of the upper portion 62 of the vortical chamber 60 and a minimum radius 86 corresponding to the maximum radius 68 of the lower portion 64 of the vortical chamber. The radial inflow turbine 48 further includes a turbine shaft 88 operatively connected to the turbine hub 74 and to the rotor/wing drive shaft 38. In one embodiment, the rotor/wing drive shaft 38 and the turbine shaft 88 are integrally formed. The turbine hub 74, the vanes 76, and the turbine shaft 88 rotate together and the rotor/wing 36 is rotated by torque received from the turbine shaft during operation of the aircraft 10.

As shown in FIG. 8, the aircraft 10 may include a gearbox 90 connected to the turbine shaft 88 and the rotor/wing drive shaft 38 for transmitting power transferred from the turbine shaft to the drive shaft. In one embodiment, the gearbox 90 is a reduction gearbox for reducing the power and rotational speed imparted to the drive shaft 38 from the turbine shaft 88. In one embodiment, the gearbox 90 is a planetary gearbox. Although other types of gearboxes 90 may be used without departing from the scope of the present disclosure, in one embodiment the gearbox is an accessory gearbox available from Northstar Aerospace Inc of Bedford Park, Ill. The gearbox 90 may have one or more stages and although the gearbox 90 may have other reduction ratios without departing from the scope of the present disclosure, in one embodiment the gearbox has a reduction ratio of between about 7:1 and about 9:1.

As shown in FIGS. 11 and 12, the radial inflow turbine 48 further includes an inlet valve 92, 94 positioned within the turbine body 50 adjacent to each inlet 52, 54. Although the inlet valves 92, 94 may be other types without departing from the scope of the present disclosure, in one embodiment each valve is a butterfly valve (also known as a sliding door valve) or a ball valve. The inlet valves 92, 94 selectively allow power plant 32, 34 exhaust to pass through the radial inflow turbine 48 from the respective inlet 52, 54 to the corresponding aft outlet 56, 58 for high-speed flight in the fixed mode or direct the exhaust through the vortical chamber 60 for flight in the rotation mode. For directing power plant 32, 34 exhaust through the vortical chamber 60, the exhaust is first diverted from the respective inlet 52, 54 generally upward into the upper portion 62 of the vortical chamber 60 by the respective inlet valve 92, 94, then the exhaust flows generally radially inward in the vortical chamber and generally downward through the vortical chamber and against the oblique surfaces 82 of the vanes 76, as shown by arrow E in FIG. 12. As described above, the exhaust flowing against the oblique surfaces 82 of the vanes 76 causes the vanes and turbine hub 74 to rotate thereby rotating the turbine shaft 88, the drive shaft 38, and the rotor/wing 36.

For embodiments having a single power plant (not shown), the radial inflow turbine 48 can be configured in a variety of ways. For example, the turbine 48 may include a sole inlet positioned at about a center of an upstream end of the turbine for transferring exhaust from a single power plant to the vortical chamber and a sole outlet positioned at about a center of a downstream end of the turbine. It is contemplated that in one embodiment (not shown), the exhaust from two or more power plants are combined upstream from the turbine and enter the turbine through a sole turbine inlet.

Figure 9:
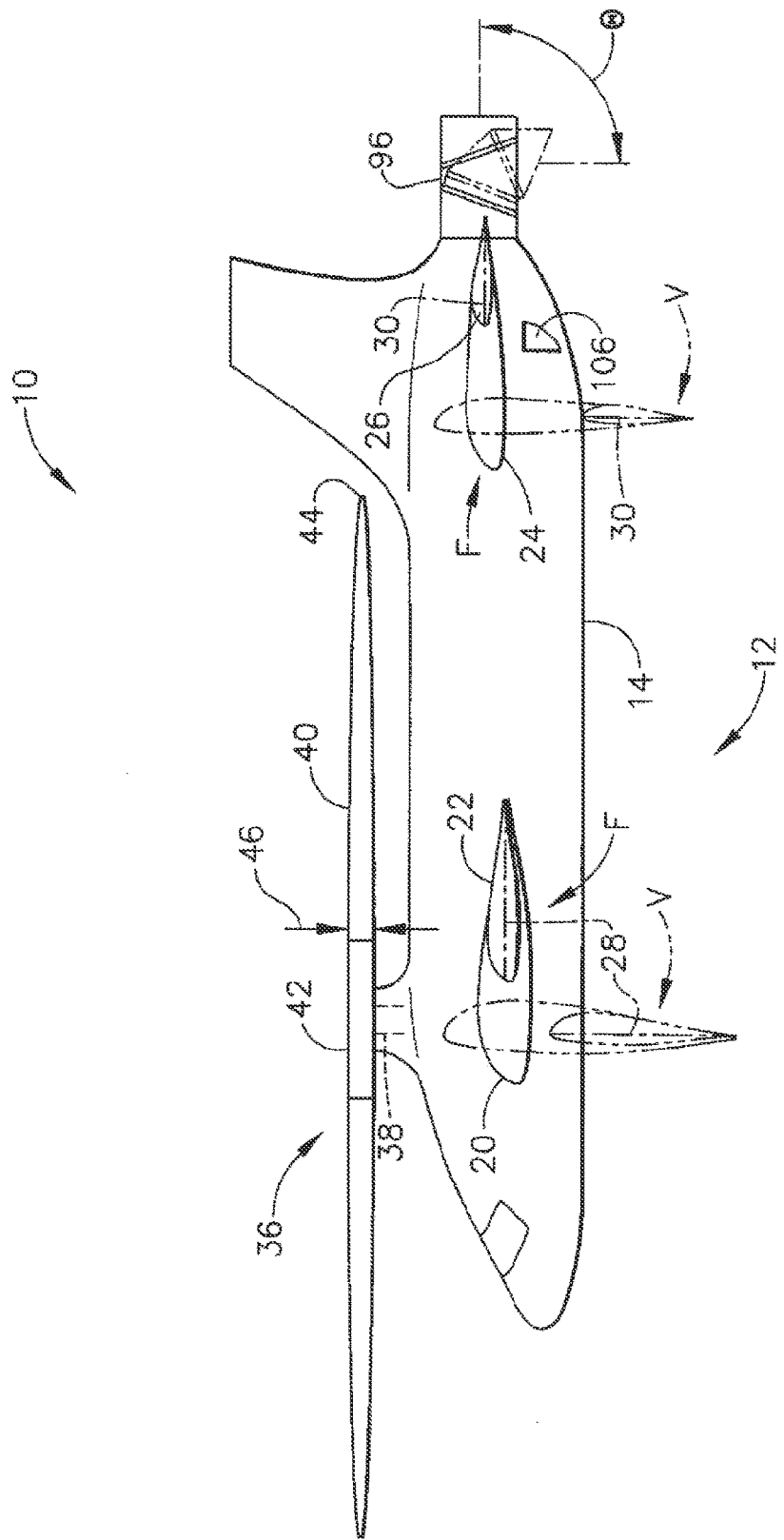
FIG. 9 is a side view of the aircraft of FIG. 8.

As shown in FIGS. 8 and 9, the aircraft 10 further comprises a nozzle 96 mounted on the airframe 12 adjacent to the aft end 18 of the fuselage 14. The nozzle 96 is in fluid communication with the power plants 32, 34 for receiving exhaust. The nozzle 96 may be operatively connected to each aft outlet 56, 58 of the radial inflow turbine 48 for receiving power plant 32, 34 exhaust exiting the aft outlets for high-speed flight in the fixed mode. For example, a high-energy conduit 98 (shown in FIG. 8) may connect the aft outlets 56, 58 to the nozzle 96. The nozzle 96 may also be operatively connected to the chamber outlet 70 for receiving exhaust during aircraft 10 operation. For example, the aircraft 10 may further comprise a conduit valve 100 for selectively diverting exhaust flowing through the low-energy conduit 72 to the high-energy conduit 98 and to the nozzle.

The nozzle 96 may be adjustable between multiple positions to provide thrust in various directions. In one embodiment, the nozzle 96 selectively directs exhaust to exit the aircraft 10 at a pre-selected angle E (shown in FIG. 9) with respect to the airframe 12 within a range of angles extending from about horizontally rearward (i.e., θ is about 0°), as shown by solid lines, and about vertically downward (i.e., θ is about 90°), as shown by dashed lines. When the nozzle 96 is angled rearward, the exhaust exiting the aircraft 10 provides forward thrust and when the nozzle is angled downward, the exhaust provides upward thrust. When the nozzle 96 is vectored to an angle θ between about 0° and 90°, the exiting exhaust provides thrust between forward and upward according to the position of the nozzle. Aircraft 10 capable of providing vertical thrust from two locations of the aircraft are referred to as two-poster aircraft. In the present disclosure, two-poster characteristics are present in the upward thrust provided at the aft end 18 of the fuselage 14 by vectoring the nozzle 96 to an angle θ greater than zero and by the rotor/wing 36. Two-poster aircraft 10 have enhanced flight performance abilities compared to single-poster aircraft because they can operate with a wider variety of centers of gravity by controlling the amount of vertical thrust produced at each poster. For embodiments of the aircraft 10 comprising multiple power plants 32, 34 and corresponding turbine inlets 52, 54 and aft outlets 56, 58, the aircraft may include a separate nozzle (not shown) in fluid communication with each aft outlet.

As shown in FIG. 8, the aircraft 10 also comprises a yaw control system, generally designated by 102, mounted on the airframe 12 adjacent to the aft end 18 of the fuselage 14. The yaw control system 102 is in fluid communication with the power plants 32, 34 for receiving exhaust for actively controlling yaw. Specifically, the yaw control system 102 is operatively connected to the chamber outlet 70 by way of the low-energy conduit 72 for receiving power plant 32, 34 exhaust exiting the radial inflow turbine 48 through the chamber outlet during aircraft 10 operation. The yaw control system 102 may also be operatively connected to the aft outlets 56, 58 for receiving exhaust during aircraft 10 operation. For example, the conduit valve 100 may be configured for selectively diverting exhaust flowing through the high-energy conduit 98 to the low-energy conduit 72 during aircraft 10 operation. Yaw control may be needed to control aircraft 10 yaw during operation in the rotation mode. Although the yaw control system 102 may be other types without departing from the scope of the present disclosure, in one embodiment (not shown) the yaw control system is a NOTAR® system available from the Boeing Company of Chicago, Ill. NOTAR® is a federally registered trademark of the Boeing Company. In one embodiment, the yaw control system 102 includes right and left lateral outlets 104, 106 connected by a valve 108. The yaw control system valve 108 is controlled to selectively direct exhaust received from the low-energy conduit 72 to the right lateral outlet 104, to the left lateral outlet 106, or to both lateral outlets to control 10 yaw during operation of the aircraft 10.

It will be appreciated that additional embodiments in accordance with the present disclosure may be conceived, and that the invention is not limited to the particular embodiments described above and shown in the accompanying figures. For example, aspects of the various embodiments shown in some of the figures may be selectively combined, included, or substituted for various aspects of other embodiments shown in other figures to create still other embodiments. For example, in some embodiments, the aircraft shown in FIG. 5 may be configured to include a vectorable nozzle assembly (e.g. FIG. 4), or pivotable canards (e.g. FIG. 2-4), or a pivotable tail assembly (e.g. FIG. 2-4) to create additional embodiments. Alternately, the vertical tail surfaces of the tail assemblies shown in FIGS. 1-7 may be eliminated and replaced with a single vertical tail that extends generally upwardly from an aft portion of the fuselage to provide further embodiments. The embodiments shown in FIGS. 1-7 may be configured as single engine configurations or multiple-engine configurations. Furthermore, one or more aspects of the embodiments shown in the accompanying figures may be modified or omitted completely to provide still other embodiments in accordance with the present disclosure.

What is claimed is:

1. A method of operating an aircraft having a rotor/wing assembly and a nozzle, the method comprising:
   vectoring the nozzle into a position for creating vertical thrust;
   using the rotor/wing assembly and the nozzle together to create vertical thrust during a rotary mode of operation, wherein the aircraft includes a turbine engine to produce an exhaust flow, wherein the rotor/wing assembly is configured to extract work from the exhaust flow and then direct the exhaust flow to the nozzle during the rotary mode of operation, wherein the rotor/wing assembly includes a rotor/wing and a turbine to drive the rotor/wing during the rotary mode of operation, the turbine including an inlet, a valve disposed in the inlet, an outlet, a vortical chamber and a chamber outlet, the inlet to receive the exhaust flow from the turbine engine, and wherein the aircraft includes a conduit fluidly coupling the outlet to the nozzle; and
   bypassing the rotor/wing assembly and using the nozzle to create forward thrust during a fixed mode of operation by operating the valve to direct the exhaust flow from the inlet to the outlet of the turbine.

2. The method of claim 1, wherein the position is a downward position, and wherein using the nozzle to create forward thrust during the fixed mode of operation includes vectoring the nozzle into an aftward position.

3. The method of claim 2, wherein the nozzle is disposed at an aft end of the aircraft.

4. The method of claim 1, wherein using the rotor/wing assembly to create vertical thrust during the rotary mode of operation includes operating the valve to direct the exhaust flow from the inlet, through the vortical chamber, to the chamber outlet.

5. The method of claim 4, wherein the conduit is a first conduit, and wherein the aircraft further includes a second conduit fluidly coupling the chamber outlet to the first conduit.

6. The method of claim 5, further including directing the exhaust flow from the second conduit to the first conduit during the rotary mode of operation, thereby providing the exhaust flow to the nozzle during the rotary mode of operation.

7. The method of claim 6, wherein the valve is a first valve, and wherein directing the exhaust flow from the second conduit to the first conduit includes operating a second valve disposed at a junction of the first conduit and the second conduit.

8. The method of claim 7, further including diverting a portion of the exhaust flow from the first conduit using the second valve to provide yaw control during the fixed mode of operation.

9. The method of claim 4, wherein the turbine is a radial inflow turbine.

10. The method of claim 5, further including diverting a portion of the exhaust flow from the second conduit to a yaw control system to provide yaw control during the rotary mode of operation.

11. The method of claim 10, wherein the yaw control system includes a left lateral outlet and a right lateral outlet.

12. The method of claim 11, wherein the valve is a first valve, further including operating a second valve to divert the exhaust flow to at least one of the left lateral outlet or right left lateral outlet.

13. The method of claim 11, wherein the left and right lateral outlets are near an aft end of the aircraft.

14. The method of claim 1, further including locking the rotor/wing to prevent rotation of the rotor/wing during the fixed mode of operation.

15. The method of claim 1, wherein the aircraft includes canards, and wherein the method further includes pivoting the canards during conversion between the fixed and rotary modes of operation.

16. The method of claim 1, wherein the aircraft includes a tail assembly, and wherein the method further includes pivoting the tail assembly during conversion between the fixed and rotary modes of operation.

17. The method of claim 1, further including independently controlling an amount of vertical thrust produced by each of the rotor/wing assembly and the nozzle.

* * * * *